United States Patent [19]

Suzuki

[11] Patent Number: 4,972,178
[45] Date of Patent: Nov. 20, 1990

[54] FIRE MONITORING SYSTEM

[75] Inventor: Takashi Suzuki, Tokyo, Japan

[73] Assignee: Nittan Company, Limited, Japan

[21] Appl. No.: 332,744

[22] Filed: Apr. 4, 1989

[30] Foreign Application Priority Data

Apr. 5, 1988 [JP] Japan .................................. 63-82344
Jun. 8, 1988 [JP] Japan ................................ 63-139460

[51] Int. Cl.⁵ ............................................. G08B 17/12
[52] U.S. Cl. .................................. 340/577; 340/584;
340/587; 374/119; 374/117
[58] Field of Search ...................... 340/577, 584, 587;
374/117, 118, 119

[56] References Cited

U.S. PATENT DOCUMENTS

| | | | |
|---|---|---|---|
| 4,112,756 | 9/1978 | MacLennan | 73/861.27 |
| 4,119,950 | 10/1978 | Redding | 73/24 |
| 4,201,087 | 5/1980 | Akita et al. | 374/119 |
| 4,215,575 | 8/1980 | Akita et al. | 374/119 |
| 4,810,100 | 3/1989 | Shavit et al. | 374/117 |

FOREIGN PATENT DOCUMENTS

| | | |
|---|---|---|
| 0125061 | 11/1984 | European Pat. Off. . |
| 0152874 | 8/1985 | European Pat. Off. . |
| 0198732 | 10/1986 | European Pat. Off. . |
| 0256686 | 2/1988 | European Pat. Off. . |
| 2153999 | 8/1985 | United Kingdom . |

Primary Examiner—Joseph A. Orsino
Assistant Examiner—Geoff Sutcliffe
Attorney, Agent, or Firm—Stevens, Davis, Miller & Mosher

[57] ABSTRACT

In a fire monitoring system for monitoring the occurrence of a fire in which a space to be monitored is imaginarily subdivided into plural subspaces so that plural channels passing through the subspaces are set so as to intersect to each other in a lattice form. The propagation speed of ultrasonic waves propagating through each of the channels is measured, on the basis of which the propagation speed of the ultrasonic waves in each of the subspaces is calculated in the same manner as the solution for each element of a matrix is obtained, and then the temperature in each of the subspaces is obtained. By providing the system with a humidity sensor, the temperature for a dry condition is obtained.

9 Claims, 3 Drawing Sheets

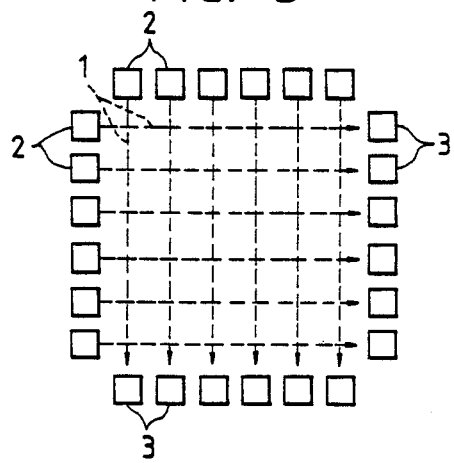
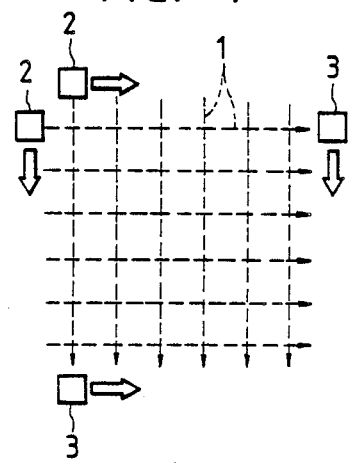
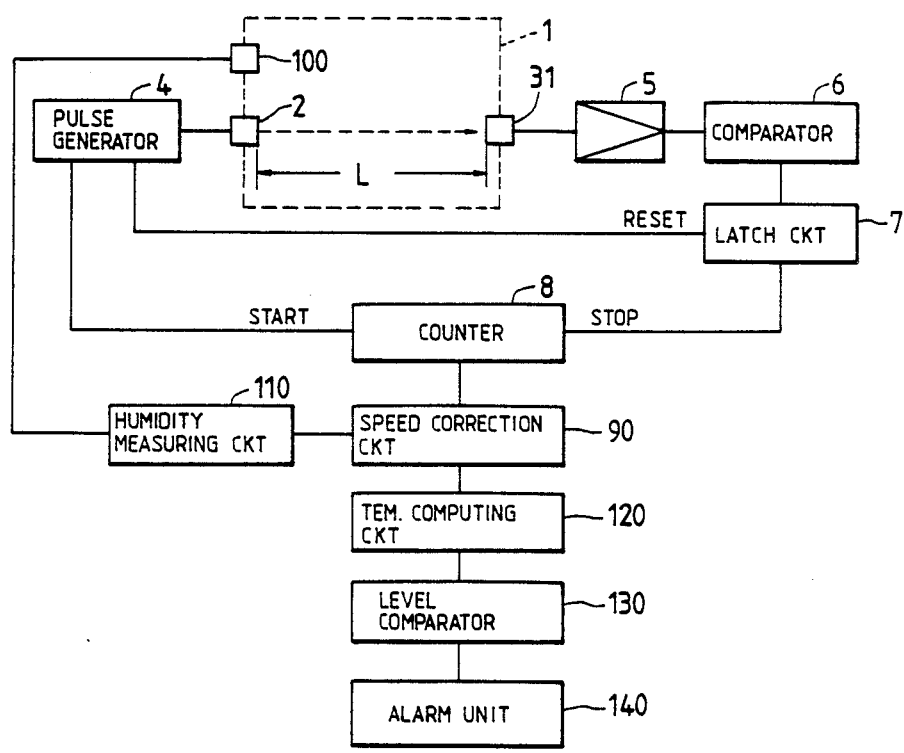

FIRE MONITORING SYSTEM

BACKGROUND OF THE INVENTION

The present invention relates to a fire monitoring system for detecting the occurrence of a fire, more particularly to a fire monitoring system for detecting the occurrence of a fire by monitoring a rise in temperature within a space to be monitored.

There have so far been proposed and put into practical use several systems for monitoring the temperature of a broad space to be monitored. Among them, the monitoring system in which the temperature is detected from the propagation speed of ultrasonic waves has been attracting attention since it involves less equipment but is capable of covering relatively broad space to be monitored. Japanese Unexamined Published Utility Model Application No. 96388/76, for example, discloses a fire sensing device utilizing ultrasonic waves as shown in FIG. 1. In detail, there are disposed an ultrasonic wave generator 20 and an ultrasonic wave receiver 21 arranged so as to confront each other at a suitable interval, and a light emitting source 22 and a light-receiving unit 23 arranged so as to confront each other and juxtaposed with the line joining the above two units. An intermittent oscillator 24 drives the ultrasonic wave generator to intermittently emit ultrasonic waves therefrom and at the same time causes the light emitting source 22 to emit light therefrom. A light signal received by the light-receiving element 23 triggers a gate signal generator 25 to keep open a gate circuit 26 disposed between the ultrasonic receiver 21 and a switching circuit 27 for a prescribed period of time. The period for keeping the circuit open is set to be shorter than the period, when the space to be monitored is at room temperature, from the time of driving the ultrasonic generator 20 to the time of arrival of an output signal of the ultrasonic receiver to the switching circuit 27. In other words, when the temperature of the space to be monitored goes up due to occurrence of a fire, the propagation speed of the ultrasonic waves is increased so that an output signal of the ultrasonic wave receiver 21 reaches the switching circuit 27 within the above mentioned prescribed period, and causes the relay switch 28 to be actuated.

With such a system for monitoring a temperature rise in the space to be monitored by use of ultrasonic waves, it is possible to linearly monitor the temperature and monitor a broad space by use of a single unit of the device.

However, when the space to be monitored is too broad, there may be cases where a local rise in temperature is difficult to be accurately detected. For example, when a monitoring space extending linearly from the ultrasonic wave generator to the ultrasonic wave receiver is assumed to comprise an assembly of imaginary subspaces, only accumulated value of the propagation time for traversing each subspace is obtained as a result of the detection. Therefore, since there may be some subspaces in which temperature rise is taking place locally and also there may be some subspaces in which temperature fall is taking place locally, it may occur that the accumulated value is approximately equal to zero, and therefore it is not possible to detect the temperature rise.

Further, the propagation speed of ultrasonic waves in the air varies with the humidity as shown in the following table.

| Temperature | Speed of Sound | |
| --- | --- | --- |
| | Humidity 0% | Humidity 100% |
| 20° C. | 343 (m/s) | 345 (m/s) |
| 40 | 355 | 359.5 |
| 60 | 366 | 377 |
| 80 | 377 | 404 |

As can be seen from the table, the influence of the humidity on the propagation speed of the ultrasonic waves will become conspicuous at temperatures above 60° C., although it is of little significance at room temperature. In particular, in the temperature range of 60°–80° C. where occurrence of a fire is to be judged, the influence of the humidity can no longer be disregarded. Moreover, it is well known the humidity goes up due to the burning of lumber and the like, so that the rise in the humidity cannot be neglected in judging the occurrence of a fire.

SUMMARY OF THE INVENTION

In the fire monitoring system according to one aspect of the present invention, a space to be monitored is subdivided two-dimensionally into plural imaginary subspaces, a plural detection channels that pass through an arbitrary number of the imaginary subspaces are set up so that they intersect to each other in a lattice form to measure each propagation speed of ultrasonic waves for each of these channels, propagation speed in each of the imaginary subspaces is determined from the measured result, and the temperature of each imaginary subspace is obtained from the propagation speed.

The fire monitoring system according to a second aspect of present invention, comprises ultrasonic wave generating means which emits ultrasonic waves into a space to be monitored, speed measuring means which measures the propagation speed of ultrasonic waves that are emitted by the ultrasonic wave generating means and propagate within the space to be monitored, humidity measuring means which measures the humidity within the space to be monitored, speed correcting means which determines the propagation speed in dry condition by correcting a signal obtained from the speed measuring means with a signal obtained from the humidity measuring means, temperature computing means which computes the temperature within the space to be monitored based on a signal obtained from the speed correcting means, and monitor signal generating means which generates a fire monitoring signal by comparing a signal obtained by the temperature computing means with a predetermined signal.

BRIEF DESCRIPTION OF THE DRAWINGS

FIG. 3 is a diagram showing an arrangement of ultrasonic wave generators and ultrasonic wave receivers when a plural pairs of the ultrasonic wave generators and ultrasonic wave receivers are used in the fire monitoring system in FIG. 2;

FIG. 4 is a diagram showing the arrangement of the ultrasonic wave generators and the ultrasonic wave receivers when two pairs of the ultrasonic wave generators and ultrasonic wave receivers are used in the fire monitoring system in FIG. 2;

FIG. 5 is a block diagram showing a second embodiment of the fire monitoring system according to the present invention.

DETAILED DESCRIPTION OF THE INVENTION

The speed C of sound wave is determined from the distance L(m) from the generating source of ultrasonic waves to the receiver and the time t (s) required for the sound wave to propagate over the distance by the following equation:

$$C = \frac{L}{t}$$

In addition, the speed C of the sound wave depends upon the temperature T° C. by the following equation:

$$C = 331.56 + 0.61T,$$

so that the temperature T° C. can be obtained from the following equation:

$$T = \frac{C - 331.56}{0.61}$$

As a result, by determining the time t (s) required for the sound wave to propagate over a predetermined distance, it is possible to determine the temperature T° C.

Further, the speed $C_w$ (m/s) of the sound wave when there is included water vapor of pressure P (mmHg) in air of pressure H (mmHg) can be derived from the speed C (m/s) of sound in dry air at the same temperature by the following equation:

$$C_w = \frac{C}{\sqrt{1 - \frac{P}{H}\left(\frac{\gamma w}{\gamma a} - 0.622\right)}}$$

In the above equation, $\gamma w$ and $\gamma a$ are the ratio of the isopiestic specific heat and the isovolumic specific heat for water vapor and dry air, respectively. These values vary little with the temperature as shown by the following table, so that $\gamma w / \gamma a$ may be regarded approximately constant.

|  | Temperature | Isopiestic Specific Heat/ Isovolumic Specific Heat |
|---|---|---|
| Dry Air | 20° C. | $\gamma a = 1.403$ |
| " | 100 | $\gamma a = 1.400$ |
| Water Vapor | 100 | $\gamma w = 1.33$ |
| " | 400 | $\gamma w = 1.34$ |

As described above, the speed $C_w$ of the sound wave can be determined from the distance L(m) from the generating source of ultrasonic waves to the receiver, and the time t (s) required for the sound wave to propagate over the distance by the following equation.

$$C_w = \frac{L}{t}$$

Therefore, the speed C of the sound wave in a dry air at an arbitrary temperature can be determined from the speed $C_w$ of the sound wave at the same temperature obtained by the measurement of the propagation of the sound wave time and the water vapor pressure obtained by the humidity measurement, by the following equation.

$$C = C_w \times \sqrt{1 - \frac{P}{H}\left(\frac{\gamma w}{\gamma a} - 0.622\right)}$$

Once the speed C of the sound wave is determined, by use of its dependence on the temperature T° C. represented by the following equation:

$$C = 331.56 + 0.61T,$$

the temperature T° C. can be given by the following equation:

$$T = \frac{C - 331.56}{0.61}$$

Preferred embodiments of the fire monitoring system according to the present invention will be described with reference to the accompanying drawings.

Figure 1:
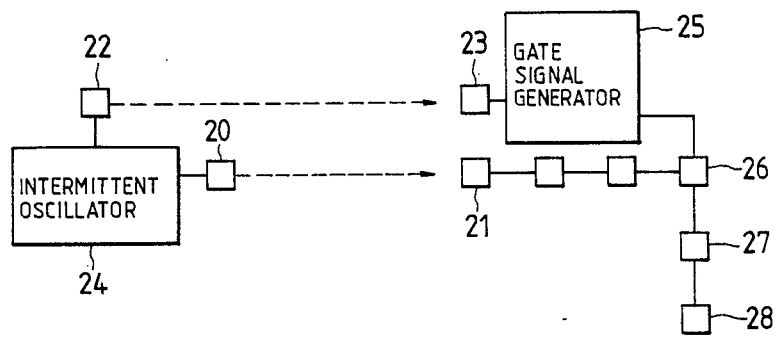
FIG. 1 is a block diagram showing the conventional fire monitoring system.
Figure 2:
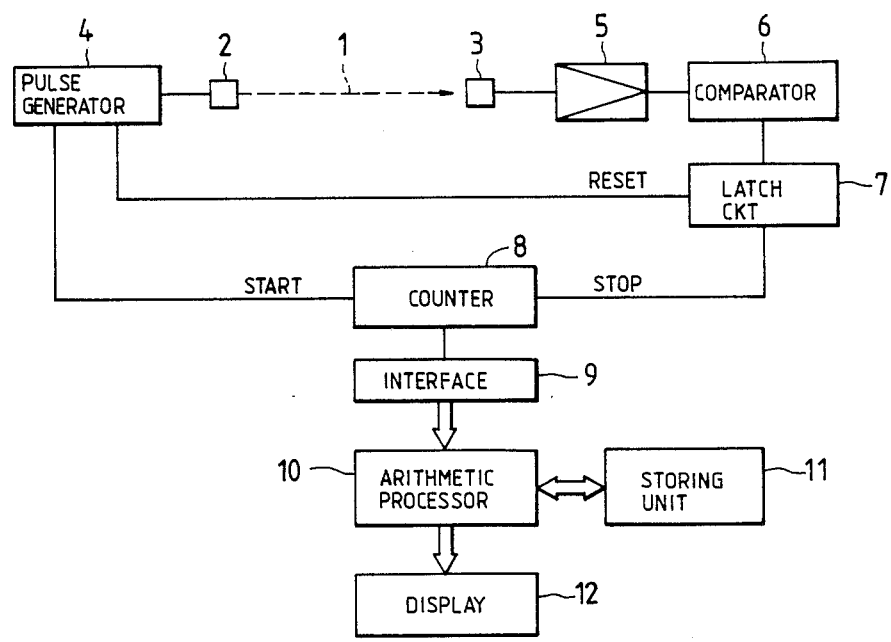
FIG. 2 is a block diagram showing a first embodiment of the fire monitoring system according to the present invention.
Figure 6:
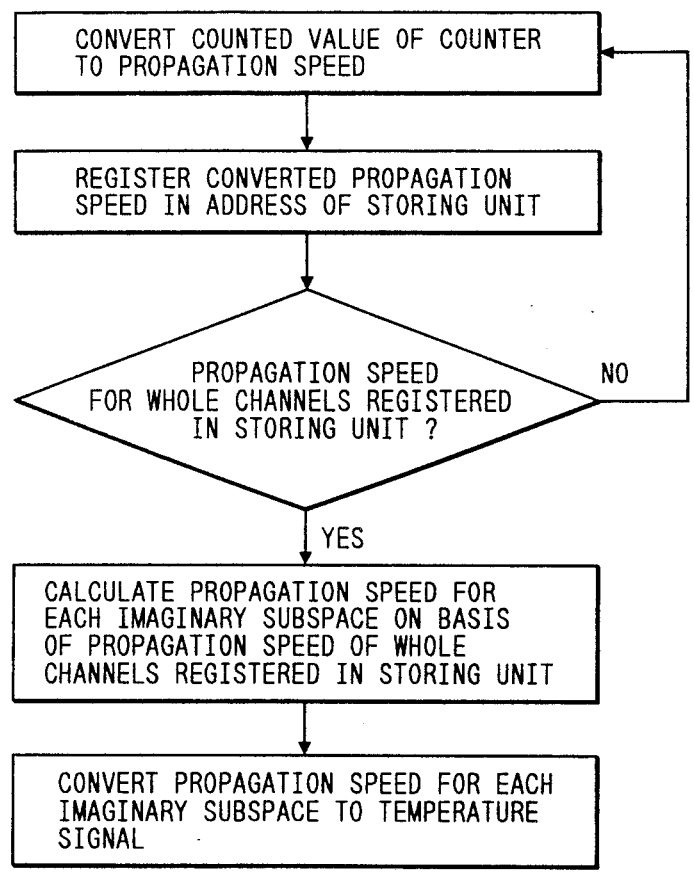
FIG. 6 is a flow chart showing the program for accomplishing the calculations for this invention.

FIG. 2 is a block diagram showing the arrangement of the fire monitoring system according to a first aspect of this invention, in which an ultrasonic wave generator 2 and an ultrasonic wave receiver 3 are disposed so as to confront each other at a suitable interval. Plural pairs of the ultrasonic wave generator 2 and the ultrasonic wave receiver 3 are arranged so that channels 1 for ultrasonic waves defined between respective pairs intersect each other to form a lattice as shown in FIG. 3, and a space to be monitored is two dimensionally subdivided into a plurality of imaginary subspaces. The ultrasonic wave generator 2 is actuated by a pulse generator 4 for intermittently generating pulses, and emits ultrasonic waves intermittently. The output of the ultrasonic wave receiver 3 after being amplified by an amplifier 5 is inputed to a comparator 6. The comparator 6 is provided to output only signals each having a level equal to or higher than a prescribed level in the output signals of the ultrasonic wave receiver, thereby to prevent malfunctions of the system due to noise. The output signals of the comparator 6 are inputed to a latch circuit 7. The latch circuit 7 is provided to keep a stop signal of a counter 8 until the next ultrasonic pulse is generated, and the circuit 7 is reset by an output of the pulse generator 4. The counter 8 is provided to measure the time required for the ultrasonic waves to reach from the ultrasonic wave generator 2 to the ultrasonic wave receiver 3. The counting operation of the counter 8 is started in response to an output of the pulse generator 4 and stopped in response to an output of the latch circuit 7. That is, the time required for the ultrasonic waves to traverse the space to be monitored is converted to a counted value. An outputed of the counter 8 is input through an interface 9 to an arithmetic processor 10, and after being converted to a propagation speed it is registered in an address of a storing unit 11. The address represents a channel through which the ultrasonic waves have passed.

In the above construction, at least stages 10 to 12 succeeding the interface 9 are commonly connected for all the pairs. Further, the pulse generator 4, amplifier 5, comparator 6, latch circuit 7 and counter 8, also may be commonly provided for all the pairs by conducting a switching operation for each pair or may be individually provided for each pair.

In the above manner, data on propagation speed of the ultrasonic waves for the whole channels are registered in the storing unit 11. The data registered in the storing unit 11 may be the counted value itself In this case, the counted value may be converted to the propagation speed by the arithmetic processor 10 after read from the storing unit.

The arithmetic processor 10 determines the propagation speed of the ultrasonic wave for each imaginary subspace in the same manner as the value for each element of a matrix is determined. In other words, the solution is obtained in the same manner as a set of simultaneous equations are solved.

The solution for the propagation speed in each of the imaginary subspace is converted to the temperature signal by the arithmetic processor 10, and displayed at a position on the display unit 12 corresponding to each imaginary subspaces in terms of variable density, color, numerical value or the like which corresponds to the temperature signal. In this manner, it is possible to display a two-dimensional temperature distribution of the space to be monitored.

Although as many pairs of the ultrasonic wave generators 2 and the ultrasonic wave receivers 3 as the number of channels for monitoring are provided in the above embodiment, there may be provided one or few pairs of these elements to be used for all channels by moving the pairs vertically and horizontally as shown in FIG. 4.

In the embodiment as described above, the influence of temperature fluctuation in a space to be monitored can be eliminated, however, the influence of humidity on the detection of temperature still remains.

FIG. 5 is a block diagram showing the arrangement of the fire monitoring system according to a second aspect of this invention. In FIG. 5, the same elements as those as shown in FIG. 2 are represented by the same reference numerals. In the same way as the first embodiment as described above, the ultrasonic wave generator 2 is actuated by the pulse generator 4 for intermittently generate pulses, and emits ultrasonic waves intermittently. An output of the ultrasonic wave receiver 3 is inputed to the comparator 6 after being amplified by the amplifier 5. The comparator 6 applies to a latch circuit 7 the output signals of the ultrasonic wave receiver which consist of those signals having a level equal to or higher than a predetermined value to thereby prevent malfunctions of the system due to noise. The latch circuit 7 keeps a stop signal from the counter 8 until the next ultrasonic wave pulse is generated, and it is reset by an output of the pulse generator 4. The counter 8 measures the period when the ultrasonic waves propagate from the ultrasonic wave generator 2 to the ultrasonic wave receiver 3, and the counting operation thereof starts in response to an output of the pulse generator 4 and stops in response to an output of the latch circuit 7. That is, the counted value represents the time required for arrival of a signal. The above elements are operated in the same manner as those in FIG. 2. The output of the counter 8 is inputed to a speed correcting circuit 90 in the stages succeeding the counter 8.

In the second embodiment of this invention, a humidity sensor 100 for measuring the water vapor pressure is provided in a space to be monitored. The output of the humidity sensor 100 is inputed to a humidity measuring circuit 110 to be converted to an electrical signal corresponding to the measured value, and then is inputed to the speed correcting circuit 90.

The speed correcting circuit 90 converts to a speed signal the output signal corresponding to the time required for the ultrasonic waves to traverse the space to be monitored, which is obtained by the counter 8 and corrects the speed signal in view of the measured water vapor pressure, that is, converts the speed signal in humid air to the speed signal representing the propagation speed in dry air. The output of the speed correcting circuit 90 is inputed to a temperature computing circuit 120. The temperature computing circuit 120 calculates the temperature corresponding to the propagation speed obtained by the speed correcting circuit 90 in response to the output of the speed correcting circuit 90. A temperature signal obtained in this way is inputed to a level comparator 130 for comparing the temperature obtained by the circuit 120 with a reference temperature to judge whether or not a fire occurs and outputs a signal to an alarm unit 140 or a display unit (not shown) if the temperature is higher than the reference temperature. The alarm unit 140 issues an alarm upon receipt of such a signal.

In the above embodiment, a humidity sensor is provided in a space to be monitored, in which one pair of an ultrasonic wave generator and an ultrasonic wave receiver is provided However, it may be provided in a space where plural pairs of the ultrasonic wave generators and the ultrasonic wave receivers are provided, for example, as shown in FIG. 2. In this case, the stages succeeding the counter 8 as shown in FIG. 2 may be replaced by those as shown in FIG. 5.

As described above, in the fire monitoring system according to the present invention, a space to be monitored is subdivided two-dimensionally into plural imaginary subspaces so that a plurality of mutually intersecting channels that pass through a plurality of arbitrary imaginary subspaces are set up in lattice form to measure the propagation speed of ultrasonic waves that propagate through each of the channels, the propagation speed of ultrasonic waves in each imaginary subspace is determined from the measurement result in the same manner as the solution for each element of a matrix is obtained, and the temperature in each of the imaginary subspace is obtained from the propagation speed, so that local temperature rise is detectable even when the space to be monitored covers a large area. Further, two-dimensional temperature distribution of the space to be monitored can easily be made comprehensible by visual display.

Further, the system may be provided with a humidity sensor to thereby linearly monitoring the temperature within the space to be monitored without being affected by the humidity, and in particular, it is possible to execute a precise monitoring of a fire in which the rise of the temperature is quick

What is claimed is:

1. A fire monitoring system for monitoring the occurrence of a fire, comprising the steps of:
 imaginarily subdividing a space to be monitored into plural subspaces so that plural channels passing through a plurality of arbitrary subspaces are set so as to intersect each other in a lattice form;

measuring a first propagation speed of ultrasonic waves propagating through each of said channels;

calculating a second propagation speed of the ultrasonic waves in each of said subspaces using a mathematical method in which the first propagation speeds and variables for the second propagation speeds are placed into matrices and the solution to an equation involving the matrices, which yields the second propagation speeds, is carried out with matrices; and determining a temperature in each of said subspaces on the basis of said second propagation speed.

2. A fire monitoring system as claimed in claim 1, wherein at least two pairs of ultrasonic wave generators and ultrasonic wave receivers are arranged so that one of said two pairs is located in one of said channels and the other is located in another channel vertically intersecting the channel.

3. A fire monitoring system as claimed in claim 2, wherein said at least two pairs are moved in directions perpendicular to each other, to thereby measure all of said first propagation speeds.

4. A fire monitoring system as claimed in claim 2, wherein plural pairs of ultrasonic wave generators and ultrasonic wave receivers are arranged so that all of said pairs are assigned to all of said channels 5. A fire monitoring system as claimed in claim 1, said system further comprising the step of:

measuring humidity within the space to be monitored and correcting said first propagation speed into a propagation speed for a dry condition.

6. A fire monitoring system for monitoring the occurrence of a fire, comprising:

ultrasonic wave generating means for emitting ultrasonic waves into a space to be monitored;

speed measuring means for measuring a first propagation speed of the ultrasonic waves in the space;

humidity measuring means for measuring humidity within the space;

correcting means for correcting said first propagation speed on the basis of the measured humidity data and obtaining a second propagation speed for a dry condition; and temperature computing means for computing the temperature in the space on the basis of said second propagation speed.

7. A fire monitoring system as claimed in claim 6, said system further comprising alarming means for comparing a signal from said temperature computing means with a predetermined signal and generating a fire monitoring signal when said signal is equal to or higher in level than said predetermined signal.

8. A fire monitoring system as claimed in claim 6, wherein said humidity measuring means comprises a humidity sensor.

9. The fire monitoring system of claim including ultrasonic wave receiving means positioned in relationship to said ultrasonic wave generating means so as imaginarily to divide said space into a plurality of subspaces.

* * * * *